UNITED STATES PATENT OFFICE.

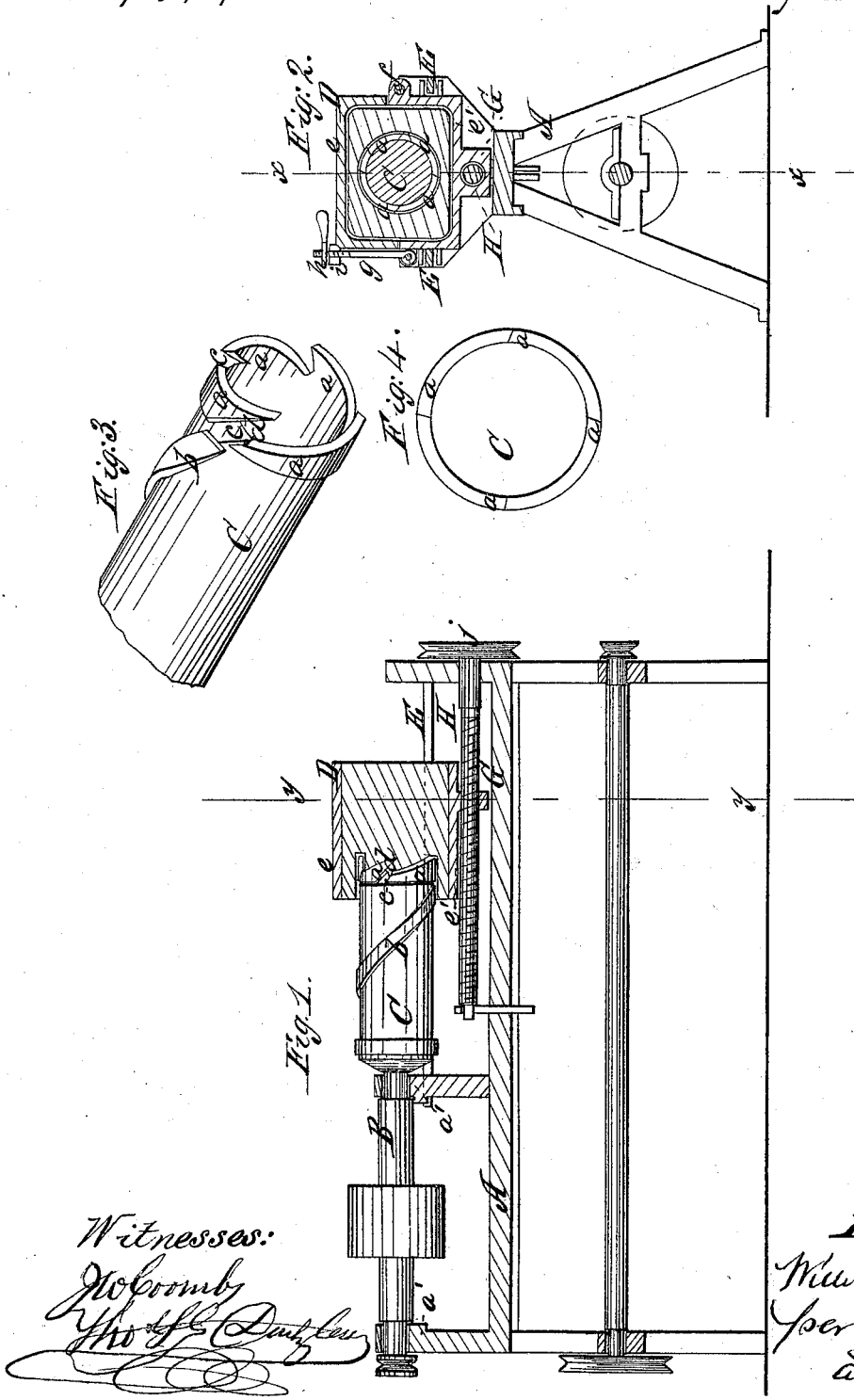

WILLIAM REID, OF WEST HEBRON, NEW YORK, ASSIGNOR TO HIMSELF AND THOMAS REID, OF SAME PLACE.

IMPROVEMENT IN MANUFACTURING CASKS.

Specification forming part of Letters Patent No. 42,445, dated April 19, 1864; antedated April 15, 1864.

*To all whom it may concern:*

Be it known that I, WILLIAM REID, of West Hebron, in the county of Washington and State of New York, have invented a new and Improved Machine for Manufacturing Casks; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a transverse vertical section of the same, taken in the line $y\ y$, Fig. 1; Figs. 3 and 4, enlarged detached views of the cutting-cylinder pertaining to the same.

Similar letters of reference indicate corresponding parts in the several figures.

This invention relates to a new and improved machine for manufacturing casks in an expeditious and perfect manner; and it consists in the employment or use of a rotating hollow cylinder, provided at one end with teeth or cutters formed or constructed in a novel way, and having a spiral flange attached to its periphery, in connection with a clamp and feeding device, all being arranged in such a manner as to effect the desired end.

To enable those skilled in the art to fully understand and construct my invention, I will proceed to describe it.

A represents a framing, which may be constructed in any proper way to support the working parts of the device; and B is a mandrel, which works in suitable bearings, $a'$, on the upper part of said framing, and has a hollow cylinder, C, attached to its inner end. This cylinder may be constructed either entirely of steel or of the latter material at its outer end, where teeth $a$ are formed, and on the periphery of said cylinder there is secured a spiral flange, $b$, said flange extending from the teeth $a$ nearly to the inner end of the cylinder. The teeth $a$ may be described as being similar to those of a saw. They have a raking position, and are a trifle thicker than the cylinder, so as to project out a little beyond the periphery of the former, and make a "kerf" sufficiently wide to prevent the cylinder from bending in it, and at the same time admit of the spiral flange $b$ working freely in the kerf, the flange $b$ projecting out from the cylinder C nearly or quite as far as the teeth $a$. The teeth $a$ are not in close contact, spaces $c$ being allowed between them, which are beveled so as to form feather edges, as shown at $d$, and filed or cut down so as to form grooves between the teeth, said grooves having oblique positions, as shown clearly in Figs. 1 and 4.

D represents what I term a "clamp," which may be formed of two parts, $e\ e'$, connected at one side by a hinge or joint, $f$, and provided at its opposite side with a screw-rod, $g$, nut $h$, and a slotted lug, $i$, or any other suitable fastening for keeping the two parts of the clamp together. This clamp D is fitted upon two horizontal ways, E E, attached to the framing A, one at each side of the cylindrical cutter C, and parallel with it. The clamp D has a nut, G, at its under side, through which a screw, H, passes, said screw being fitted in proper bearings on the framing, and having a pulley, $j$, on its outer end.

The operation is as follows: The mandrel B may be rotated by means of a belt or any suitable gearing, and the block from which the body of the cask is to be cut is placed in the clamp D, and firmly secured therein by securing the two parts $e\ e'$ together by means of the fastening at one side of them. The clamp D is then fed along toward the cylindrical cutter C by turning the screw H, and the cutter C cuts a cylindrical hole through the block, the "core" entering the cylinder. This core is removed from the cylinder and placed in the clamp, and a cutter, C, of smaller diameter placed on the mandrel B, and made to pass through the core, so that the latter will form the body of the cask. The operation is repeated with the second core, and so on until the whole block is cut into casks, a cutter of smaller diameter being used each time to correspond with the diminishing diameters of the cores. The spiral flange $b$ on the periphery of the cylindrical cutter conveys the sawdust out of the kerf, while the teeth $a$, in consequence of being sufficiently thick to extend out a trifle beyond the periphery of the cylinder C, prevent the latter from binding in the kerf, and admit of the flange $b$ working in the kerf. The space and grooves c between the teeth a with the feather edges d at their front or outer edges throw the dust to the exterior of the cylinder, and effectually prevent the choking up or clogging of the cutter.

Having thus described my invention, what I claim as new, and desire to secure by Letters Patent, is—

1. The hollow or tubular cylindrical and rotating cutter C, in combination with the sliding clamp D, arranged substantially as and for the purpose set forth.

2. The particular manner of constructing the cylindrical cutter C—to wit, by having the spaces c between the teeth a filed or cut to form grooves with feather edges at their outer ends, and having the teeth a project out beyond the periphery of the cylinder, with a spiral flange, b, attached to the latter, as and for the purpose herein described.

WILLIAM REID.

Witnesses:
  L. FRASER,
  JOHN C. WILLIAMSON.